(12) United States Patent
Lasonde (10) Patent No.: US 7,891,114 B2
(45) Date of Patent: Feb. 22, 2011

(54) BIOMASS CONVERTERS AND PROCESSES

(75) Inventor: Wallace R. Lasonde, Appleton, WI (US)

(73) Assignee: Skill Associates, Inc., Kaukauna, WI (US)

(*) Notice: Subject to any disclaimer, the term of this patent is extended or adjusted under 35 U.S.C. 154(b) by 0 days.

(21) Appl. No.: 12/069,796

(22) Filed: Feb. 12, 2008

(65) Prior Publication Data
US 2008/0134540 A1 Jun. 12, 2008

Related U.S. Application Data

(62) Division of application No. 11/095,963, filed on Mar. 31, 2005, now Pat. No. 7,334,345.

(60) Provisional application No. 60/559,158, filed on Apr. 2, 2004.

(51) Int. Cl.
F26B 19/00 (2006.01)

(52) U.S. Cl. .................. 34/331; 34/332; 34/337; 34/344; 34/345; 34/351; 110/224; 110/233; 210/605; 435/3; 244/101.8

(58) Field of Classification Search ............. 34/331, 34/332, 337, 344, 345, 351; 110/224, 233; 210/605; 435/3; 244/101.8
See application file for complete search history.

(56) References Cited

U.S. PATENT DOCUMENTS

| | | | |
|---|---|---|---|
| 2,679,114 A | | 5/1954 | Morrison |
| 3,697,056 A | | 10/1972 | Prins, Sr. et al. |
| 3,744,145 A | | 7/1973 | Maxwell et al. |
| 4,217,878 A | * | 8/1980 | Wieweck ............... 126/110 R |
| 4,255,129 A | * | 3/1981 | Reed et al. ............... 432/13 |
| 4,313,011 A | * | 1/1982 | Weil et al. ............... 585/240 |
| 4,338,869 A | | 7/1982 | Hoskinson |
| 4,441,880 A | | 4/1984 | Pownall et al. |
| 5,129,993 A | | 7/1992 | Bleeker |
| 5,424,417 A | * | 6/1995 | Torget et al. ............... 536/56 |
| 5,503,996 A | * | 4/1996 | Torget et al. ............... 435/105 |
| 5,589,599 A | | 12/1996 | McMullen et al. |

(Continued)

FOREIGN PATENT DOCUMENTS

DE 3440484 A1 * 5/1986

(Continued)

Primary Examiner—Stephen M. Gravini
(74) Attorney, Agent, or Firm—Thomas D. Wilheim; Wilhelm Law, S.C.

(57) ABSTRACT

This invention pertains to a bio-mass processing system, and method of processing waste bio-mass, wherein one or more mixers mixes a bed of bio-mass material such as manure at substantially any and all locations in a defined length and width portion of the bed, in a dryer. Heated air percolates upwardly through the bed. Separation apparatus separates a relatively dryer fraction of the bio-mass material from the dryer. The separated finished product from the dryer is optionally fed to a boiler where the dried bio-mass material is burned. Heat of combustion from the boiler is used as dryer heat for drying the bio-mass feed material in the dryer. Excess heat is optionally used to produce steam, which powers a turbine, which powers an electrical generator. Residual ash from the combustion process comprises about 2% by weight of the solids content of e.g. a feed stream coming into the dryer.

77 Claims, 4 Drawing Sheets

U.S. PATENT DOCUMENTS

| | | | |
|---|---|---|---|
| 5,597,732 | A | 1/1997 | Bryan-Brown |
| 5,666,890 | A * | 9/1997 | Craig .......................... 110/229 |
| 5,678,494 | A * | 10/1997 | Ulrich ......................... 110/224 |
| 5,682,683 | A * | 11/1997 | Haimer ........................ 34/425 |
| 5,705,369 | A * | 1/1998 | Torget et al. ................. 435/105 |
| 5,803,936 | A * | 9/1998 | Huber .......................... 48/61 |
| 5,833,851 | A | 11/1998 | Adams et al. |
| 6,168,709 | B1 * | 1/2001 | Etter ........................... 208/131 |
| 6,190,566 | B1 | 2/2001 | Kolber |
| 6,243,968 | B1 | 6/2001 | Conrad et al. |
| 6,284,529 | B1 | 9/2001 | Carrera |
| 6,302,039 | B1 * | 10/2001 | MacCallum et al. ........ 110/348 |
| 6,367,395 | B1 | 4/2002 | Masek |
| 6,393,722 | B1 | 5/2002 | Chardine |
| 6,410,283 | B1 | 6/2002 | Rehmat et al. |
| 6,451,589 | B1 | 9/2002 | Dvorak |
| 6,560,895 | B1 | 5/2003 | Clark |
| 6,660,506 | B2 * | 12/2003 | Nguyen et al. .............. 435/165 |
| 6,692,544 | B1 * | 2/2004 | Grillenzoni .................. 44/589 |
| 6,766,592 | B1 | 7/2004 | Clark |
| 6,878,212 | B1 * | 4/2005 | Pinatti et al. ................. 127/1 |
| 6,987,792 | B2 * | 1/2006 | Do et al. ...................... 373/18 |
| 7,105,088 | B2 | 9/2006 | Schien et al. |
| 7,238,242 | B2 * | 7/2007 | Pinatti et al. ................. 127/37 |
| 7,334,345 | B2 * | 2/2008 | Lasonde ....................... 34/181 |
| 7,452,392 | B2 * | 11/2008 | Nick et al. ................... 48/198.1 |
| 7,749,476 | B2 * | 7/2010 | Constantz et al. ........... 423/430 |
| 7,753,618 | B2 * | 7/2010 | Constantz et al. ............ 404/44 |
| 7,754,169 | B2 * | 7/2010 | Constantz et al. ........... 423/165 |
| 7,771,684 | B2 * | 8/2010 | Constantz et al. ........... 423/220 |
| 7,772,453 | B2 * | 8/2010 | Cerroni ........................ 588/405 |
| 2002/0179493 | A1 | 12/2002 | Etter ........................... 208/131 |
| 2003/0051647 | A1 | 3/2003 | Sugano et al. |
| 2003/0177963 | A1 | 9/2003 | Maxwell |
| 2003/0199049 | A1 * | 10/2003 | Nguyen et al. .............. 435/165 |
| 2004/0170210 | A1 * | 9/2004 | Do et al. ...................... 373/118 |
| 2005/0080520 | A1 * | 4/2005 | Kline et al. .................. 701/1 |
| 2005/0161038 | A1 * | 7/2005 | Pinatti et al. ................. 127/2 |
| 2005/0217134 | A1 * | 10/2005 | Lasonde ....................... 34/181 |
| 2005/0279711 | A1 * | 12/2005 | Goettert et al. .............. 210/703 |
| 2006/0032788 | A1 * | 2/2006 | Etter ........................... 208/131 |
| 2006/0112639 | A1 * | 6/2006 | Nick et al. ................... 48/198.1 |
| 2007/0266632 | A1 * | 11/2007 | Tsangaris et al. ............. 48/190 |
| 2008/0006034 | A1 * | 1/2008 | Cerroni ........................ 60/780 |
| 2008/0134540 | A1 * | 6/2008 | Lasonde ....................... 34/446 |
| 2008/0197012 | A1 * | 8/2008 | Berruti et al. ................ 201/31 |
| 2008/0216391 | A1 * | 9/2008 | Cortright et al. ............. 44/307 |
| 2008/0300434 | A1 * | 12/2008 | Cortright et al. ............. 585/1 |
| 2008/0300435 | A1 * | 12/2008 | Cortright et al. ............. 585/14 |
| 2009/0050076 | A1 * | 2/2009 | Dam-Johansen et al. ........ 122/2 |
| 2009/0189617 | A1 * | 7/2009 | Burns et al. .................. 324/649 |
| 2009/0194269 | A1 * | 8/2009 | Vinegar ........................ 166/60 |
| 2009/0194282 | A1 * | 8/2009 | Beer et al. .................. 166/272.7 |
| 2009/0194286 | A1 * | 8/2009 | Mason ......................... 166/302 |
| 2009/0194287 | A1 * | 8/2009 | Nguyen et al. ............... 166/302 |
| 2009/0194329 | A1 * | 8/2009 | Guimerans et al. ............ 175/17 |
| 2009/0194333 | A1 * | 8/2009 | MacDonald .................. 175/45 |
| 2009/0194524 | A1 * | 8/2009 | Kim ............................ 219/544 |
| 2009/0200022 | A1 * | 8/2009 | Bravo et al. ................. 166/256 |
| 2009/0200023 | A1 * | 8/2009 | Costello et al. .............. 166/260 |
| 2009/0200025 | A1 * | 8/2009 | Bravo ......................... 166/265 |
| 2009/0200031 | A1 * | 8/2009 | Miller et al. ................. 166/302 |
| 2009/0200290 | A1 * | 8/2009 | Cardinal et al. .............. 219/488 |
| 2009/0200854 | A1 * | 8/2009 | Vinegar ......................... 299/5 |
| 2009/0260823 | A1 * | 10/2009 | Prince-Wright et al. ..... 166/302 |
| 2009/0260824 | A1 * | 10/2009 | Burns et al. ................. 166/302 |
| 2009/0272526 | A1 * | 11/2009 | Burns et al. ................. 166/248 |
| 2009/0272533 | A1 * | 11/2009 | Burns et al. ............... 166/272.7 |
| 2009/0272535 | A1 * | 11/2009 | Burns et al. ................. 166/302 |
| 2009/0272536 | A1 * | 11/2009 | Burns et al. ................. 166/302 |
| 2009/0272578 | A1 * | 11/2009 | MacDonald .................. 175/26 |
| 2009/0301352 | A1 * | 12/2009 | Constantz et al. ........... 106/668 |
| 2010/0000444 | A1 * | 1/2010 | Constantz et al. ........... 106/465 |
| 2010/0024686 | A1 * | 2/2010 | Constantz et al. ........... 106/817 |
| 2010/0077655 | A1 * | 4/2010 | Bauldreay et al. ............. 44/437 |
| 2010/0077691 | A1 * | 4/2010 | Constantz et al. ............. 52/596 |
| 2010/0083880 | A1 * | 4/2010 | Constantz et al. ........... 106/801 |
| 2010/0144521 | A1 * | 6/2010 | Constantz et al. ........... 502/400 |
| 2010/0150802 | A1 * | 6/2010 | Gilliam et al. .............. 423/220 |
| 2010/0162619 | A1 * | 7/2010 | Peus ............................ 44/605 |
| 2010/0218417 | A1 * | 9/2010 | Bauldreay et al. ............. 44/438 |
| 2010/0219373 | A1 * | 9/2010 | Seeker et al. ........... 252/182.33 |
| 2010/0229725 | A1 * | 9/2010 | Farsad et al. .................... 96/74 |
| 2010/0230830 | A1 * | 9/2010 | Farsad et al. ................... 261/20 |
| 2010/0236242 | A1 * | 9/2010 | Farsad et al. ................... 60/685 |
| 2010/0239467 | A1 * | 9/2010 | Constantz et al. ........... 422/168 |
| 2010/0247410 | A1 * | 9/2010 | Constantz et al. ........... 423/224 |

FOREIGN PATENT DOCUMENTS

| | | | |
|---|---|---|---|
| EP | 519426 A2 * | 12/1992 | |
| JP | 2004245563 A * | 9/2004 | |
| JP | 2004359898 A * | 12/2004 | |
| JP | 2007169534 A * | 7/2007 | |
| JP | 2010077201 A * | 4/2010 | |
| WO | WO 9504909 A1 * | 2/1995 | |
| WO | WO 2007065241 A1 * | 6/2007 | |
| WO | WO 2007078199 A1 * | 7/2007 | |

* cited by examiner

BIOMASS CONVERTERS AND PROCESSES

CROSS-REFERENCE TO RELATED APPLICATIONS

This application claims priority as a Divisional Application under 35 U.S.C. §120 to application Ser. No. 11/095,963, filed Mar. 31, 2005 which is incorporated herein by reference in its entirety.

BACKGROUND

Increasing environmental concerns regarding the disposal of animal manure, for example and without limitation cow manure, pig manure, chicken manure, turkey manure, duck manure require new and innovative methods of disposal. Animal farming has rapidly moved toward concentrated feeding operations which produce large volumes of manure in a relatively small area. Historically, the manure has been spread over adjacent fields or transported to nearby farms. The ever increasing concentration of nutrients in the soil, which accompanies such practice, presents certain issues related to soil pollution, air pollution, and water pollution. The US Environmental Protection Agency (EPA) has produced regulations and requirements for Concentrated Animal Feeding Operations (CAFO) to address these issues.

Current dairy farming operations are moving toward farms which have increasing numbers of animals, concentrated in high density animal feeding operations. These high animal densities create environmental and social concerns which have led to the increasing regulation of manure management. Soil contamination, ground water pollution, and odor problems resulting from such feeding operations, where a relatively large number of animals are maintained in a relatively small area, are thus of increasing social concern.

Some conventional manure management systems presently in use in combination with high animal density environments, rely on a process which involves methane digesters. Such systems use anaerobic processes to produce methane gas. The methane gas is captured from the anaerobic digestion of the manure; and the gas is then burned as a fuel. While these systems do produce some usable energy, a large fraction of the volume of the manure feed stream is left after such methane gas extraction, and must be disposed of. Namely, the volume of material which still needs to be disposed of is a substantial fraction of the volume, typically substantially the same as the volume of, the raw manure feed stream.

The solids volume can be reduced at e.g. 70% water by weight by squeezing the manure in a press. However, the resulting products are a contaminating effluent, and a smaller, but still substantial, solids volume, in the form of a manure cake. The effluent is a pollution source. Similarly, the pressed solids cake is also a pollution source, which is commonly spread in farm fields.

In addition, in such anaerobic systems, which are directed toward managing large volumes of manure, which is created from a highly-concentrated population of animals, the raw manure, in generally liquidous form at about 16% solids by weight, is stored in covered earthen pits, or in concrete closed storage tanks while being processed. Storing liquid manure in such anaerobic environment results in the generation of methane, hydrogen sulfide, and other gases. Such gases are accompanied by substantial odor intensity, which is commonly considered problematic.

Thus, there is a need for a new manure management system which further addresses certain of the above issues.

SUMMARY

The invention provides an economical manure management system which meets or exceeds the CAFO requirements, and which addresses corresponding environmental and social concerns. The invention eliminates or substantially reduces the problems associated with (1) nutrient overload and (2) offensive odor. Nutrient overload results when the nutrients in the amount of manure being produced exceeds the nutrient-carrying capacity of the fields which are available to receive the manure. Nutrient addition which exceeds the carrying capacity of the fields contributes to soil toxicity or may run off in surface water, thus to pollute water resources. The alternative disposal procedure is to transport the manure over large distances to fields which have safe existing nutrient-reception capacities.

This invention contemplates collecting the manure shortly after excretion, and quickly confining, and subsequently maintaining, the collected excretion in an aerobic environment, albeit within a contained processing system. The manure is dried by water evaporation, and the resulting dried manure product is burned. Systems of the invention emit largely carbon dioxide and water from the combustion process, along with substantially smaller amounts of nitrogen oxides, sulfur oxides, and heat. Because the system digests organic matter in an aerobic environment, at appropriate temperature, the odor issue, especially the odor issue with respect to sulfur dioxide, is substantially reduced.

The combustion process is typically operated at e.g. about 1800 degrees F. in the boiler, in a low-oxygen, lean-oxygen environment. Such burn conditions minimize resulting emissions and odors from the boiler.

Thus, the invention comprehends a process which not only addresses the environmental concerns but which also greatly reduces the volume of manure which must be disposed of as a solid or liquid waste product of the animal husbandry operation. Disposal expenses and odor issues are correspondingly reduced. The heat energy produced in the boiler is used to generate electricity, which can be used on the farm and/or sold. The process also generates residual heat as a by-product, which can be used locally, optionally sold.

The residual ash, left over after the burning process in the boiler, represents about 2% of the dry basis weight of the original, raw manure feed stream which enters the processing system of the invention. Ash fertilizer analysis is typically about 0-8-10 nitrogen-phosphorous-potassium.

Systems of the invention provide a chemical-free mechanism for managing disposal and re-use of manure resources. The systems address environmental concerns about manure, while providing economic benefit to the animal husbandry operation which produces the manure. Systems of the invention convert the raw manure into dry ash, and in the process generate electricity and usable heat, all while substantially preventing the development of intense levels of offensive odor which are commonly associated with animal manures. Odor development is prevented by maintaining sufficiently aerobic conditions in the manure, from the time of collection until the dried manure is burned, to prevent substantial development of odor-producing anaerobic bacteria.

As used herein, "manure" includes a wide variety of compositions which are excreted by domesticated animals. Thus, "manure" includes feces, and can include urine. Further, "manure" can include limited quantities of wash water which are used in routinely washing animal husbandry facilities, to remove urine and fecal material, while the facilities are being used on a day-to-day basis by the respective animals. "Manure" can also include normal quantities of bedding materials which are routinely soiled by the animals and disposed of with the excreted material.

Manure for use in the invention can be collected from a wide variety of domesticated animals such as, without limitation, cows, pigs, turkeys, chickens, and ducks.

Manure from e.g. a cattle feeding operation, a cattle raising operation, or a dairy operation, is received into the processing system of the invention at about 86% by weight water, 14% solids and is dried, by evaporating water out of the manure, to about 40% by weight water, namely about 60% by weight solids. The dried manure product is fed into a boiler, and burned. Heat from the boiler is used to generate steam. The steam is used to produce electricity. Any excess electricity can be sold into the national electric grid. Remaining, relatively lower pressure, and lower temperature, steam can be put to any of a variety of uses.

Restated, collect the manure; dry the manure; burn the manure; use the so-generated heat of combustion to produce electricity; sell any electricity, which is excess to the needs of the livestock operation, into the national electric grid.

In a first family of embodiments, the invention comprehends a continuous process bio-dryer. The bio-dryer comprises a containment receptacle having a feed end and an exit end, and a length between the feed end and the exit end, a floor, and one or more upstanding walls extending upwardly from the floor; one or more mixers adapted to mix a bed of generally solid bio-mass material in the receptacle, the one or more mixers being mounted relative to the receptacle so as to be movable about a projected plan view area of the receptacle so as to be able to periodically mix such bio-mass feed material at substantially any and all locations in the projected area of the receptacle; air ducting proximate the floor of the receptacle effective to convey air and disperse such air into the receptacle in a pattern which is distributed along the length of the receptacle, and which extends across the width of the receptacle at multiple locations along the length of the receptacle, including extending across the width of the receptacle at at least one locus which is substantially displaced from both the feed end and the exit end; and separation apparatus separating relatively dryer finished product from a relatively wetter remainder fraction of the bio-mass material being processed.

In some embodiments, the receptacle has a feed end and an exit end, and at least one mixer is inclined at an angle of about 10 degrees to about 50 degrees from vertical, such that mixing activity of the respective mixer moves the material toward the exit end of the receptacle.

In some embodiments, the invention further comprises transport structure which moves the one or more mixers about the length and width of the receptacle.

In some embodiments, the air ducting proximate the floor of the receptacle is divided into at least 2 substantially mutually exclusive and different zones, optionally at least 3 substantially mutually exclusive and different zones, along the length of the receptacle, so as to enable feeding different air temperatures and/or different air flow rates in the respective different zones.

In some embodiments, the invention further comprises a computer controller which directs movement of the transport structure so as to periodically mix-process the bio-mass material throughout substantially the entirety of the projected plan view area of the receptacle. The computer controller may provide different control of at least one of air flow rate or air temperature, going to at least two of the respective zones.

In some embodiments, the invention further comprises moisture sensors in the respective zones, and the computer controller receives sensed input from the sensors, and can use such sensed input in providing the different controls in the different respective zones of the air ducting.

In some embodiments, the receptacle has a feed end and an exit end, and at least one mixer functions in the capacity of the separation apparatus, so as to move the bio-mass material toward the exit end.

In some embodiments, the invention further comprises recycle loop transport structure which carries a portion of an exit stream from the bio-dryer back to a feed locus of the bio-dryer.

In some embodiments, the invention further comprises a solid-fuel boiler adapted and configured to burn finished product, at 40 percent by weight water, from the bio-dryer, and optionally further comprises a steam turbine, further optionally comprises an electrical generator coupled to an output shaft of the turbine.

In a second family of embodiments, the invention comprehends a bio-dryer. The bio-dryer comprises a containment receptacle having a feed end and an exit end, a floor, and one or more upstanding walls extending upwardly from the floor; one or more mixers adapted to mix a bed of generally solid bio-mass material in the receptacle, the one or more mixers being mounted relative to the receptacle so as to be movable about a projected plan view area of the receptacle so as to be able to periodically mix the bio-mass feed material at substantially any and all locations in the projected area of the receptacle, at least one of the mixers being inclined at an angle of about 10 degrees to about 50 degrees from a vertical, such that mixing action of the respective mixer moves the material toward the exit end of the receptacle; and air ducting proximate the floor of the receptacle effective to convey air about the receptacle, and to release such air into the receptacle from loci adjacent the floor.

In a third family of embodiments, the invention comprehends a bio-mass processing system. The processing system comprises bed of generally solid bio-mass material to be processed; one or more mixers adapted to mix the bed of bio-mass material, the one or more mixers being mounted so as to be movable about a projected plan view area of the bed of bio-mass material at substantially any and all locations in a defined length and width portion of the bed; warm air supply apparatus supplying warm air to the air ducting; and separation apparatus separating a relatively drier fraction of the bio-mass material from a relatively wetter fraction of the bio-mass material.

In some embodiments, the warm air supply apparatus is divided into at least two substantially mutually exclusive and different supply zones, optionally at least three substantially mutually exclusive and different supply zones, along the length of the bed of bio-mass material, so as to enable feeding of different air temperatures and/or different air flow rates in the respective different zones.

In some embodiments, the bed of bio-mass material has a feed end and an exit end, and at least one mixer functions so as to move the bio-mass material toward the exit end of the dryer.

In a fourth family of embodiments, the invention comprehends a method of processing animal manure, comprising collecting and containing a bed of manure to be dried, in a work location, over a floor of a dryer, the bed of manure having a length and a width, an air supply system being associated with the floor and being effective to release air into the bed of manure at or adjacent the floor. The method further comprises supplying heated air through the air supply system to the bed of manure, thus to percolate the heated air upwardly through the bed of manure over substantial portions of both the length and the width of the bed of manure to be dried;

mixing the bed of manure to be dried while percolating the warm air upwardly through the bed of manure; moving the manure progressively through the dryer whereby a relatively drier first portion of the manure is generally displaced from a relatively wetter second portion of the bed of manure; and removing relatively dryer manure product of the drier first portion from the bed of manure and supplying fresh feed material to the dryer to replenish the manure in the dryer, thereby to operate a relatively continuous drying process.

In some embodiments, the method comprises burning the removed product to produce heat, optionally converting the heat to one or more other forms of energy such as mechanical energy, electrical energy, hydraulic energy, pneumatic energy, or chemical energy.

In some embodiments, the method includes using heat produced by the burning in supplying the warm air through the air supply system in the dryer.

In some embodiments, the dryer comprises a receptacle having upstanding walls, and the method includes containing the manure in the container while supplying the heated air, mixing the manure, and moving the manure through the dryer.

In some embodiments, the moving of the manure progressively through the dryer comprises moving the manure along a generally horizontal path from proximate a wetter inlet end of the dryer toward a relatively drier exit end of the dryer, thereby to produce the relatively drier manure product.

In some embodiments, the invention comprises recycling a portion of the relatively drier manure product to the relatively wetter inlet end of the dryer.

In some embodiments, the invention further comprises recycling a portion of the relatively drier manure product to a livestock barn as livestock bedding.

In some embodiments, the invention further comprises sensing moisture level over a substantial portion of a projected area of the bed of manure, and adjusting the process, e.g. adjusting temperature, mass flow rate of the heated air which is being supplied to the bed of manure, or adjusting frequency or rate of mixing, in response to the sensed moisture level.

In some embodiments, the method includes establishing at least two different drying zones in the bed of manure, and separately adjusting at least one of temperature and mass flow rate of the heated air to at least one of the different drying zones.

In some embodiments, the method further comprises sensing moisture level in at least two of the drying zones, and separately adjusting at least one of temperature and mass flow rate of the heated air to at least one of the drying zones in response to the moisture sensed in at least one of the drying zones.

In some embodiments, the method includes employing, in the repeated mixing of the manure, at least one mixer oriented, e.g. at an angle of about 10 degrees to about 50 degrees from vertical, such that operation of the mixer moves the manure being mixed, toward the exit end of the bed of manure.

In a fifth family of embodiments, the invention comprehends a method of processing relatively wet bio-mass material, comprising collecting and containing a bed of bio-mass material to be dried, in a work location over a floor of a dryer, the bed of bio-mass material having a length and a width, an air supply system being associated with the floor and being effective to release air into the bed of bio-mass material at or adjacent the floor; supplying heated air through the air supply system to the bed of bio-mass material, thus to percolate the heated air upwardly through the bed of bio-mass material over substantial portions of both the length and width of the bed of bio-mass material to be dried; repeatedly mixing the bed of bio-mass material to be dried while percolating the warm air upwardly through the bed of bio-mass material; moving the bio-mass material progressively through the dryer whereby a relatively drier first portion of the bed of bio-mass material is generally displaced from a relatively wetter second portion of the bed of bio-mass material; removing relatively drier bio-mass material product of the drier first portion from the bed of bio-mass material and supplying fresh bio-mass feed material to the dryer to replenish the bio-mass material in the dryer, thereby to operate a relatively continuous drying process; and burning a substantial portion of the dried bio-mass product to produce heat energy.

In some embodiments, the method comprises converting the heat energy to one or more other forms of energy such as mechanical energy, electrical energy, hydraulic energy, pneumatic energy, or chemical energy.

In some embodiments, the method comprises recycling residual heat from the conversion process and thereby providing heat for the air supply system.

In some embodiments, the dryer comprises a receptacle having upstanding walls, and the method includes containing the bio-mass material in the container while supplying the heated air, mixing the bio-mass material, and moving the bio-mass material through the dryer.

In some embodiments, the moving of the bio-mass material progressively through the dryer comprises moving the bio-mass material along a generally horizontal path from proximate a wetter inlet end of the dryer toward a relatively drier exit end of the dryer, thereby to produce the finished, relatively drier, bio-mass material product.

In some embodiments, the method further comprises recycling a portion of the relatively drier bio-mass material product to the relatively wetter inlet end of the dryer.

In some embodiments, the method further comprises sensing moisture level over a substantial portion of a projected area of the bed of bio-mass material, and adjusting at least one of temperature and mass flow rate of the heated air which is being supplied to the bed of bio-mass material.

In some embodiments, the method includes establishing at least two different drying zones in the bed of bio-mass material, sensing moisture level in at least two of the drying zones, and adjusting the process, e.g. adjusting at least one of temperature and the mass flow rate of the heated air to at least one of the drying zones, in response to the moisture sensed in at least one of the drying zones.

In some embodiments, the method includes employing, in the repeated mixing of the bio-mass material, at least one mixer oriented at an angle of about 10 degrees to about 50 degrees from vertical, such that operation of the mixer moves the bio-mass material being mixed, toward the exit end of the bed of bio-mass material.

The invention is not limited in its application to the details of construction or the arrangement of the components set forth in the following description or illustrated in the drawings. The invention is capable of other embodiments or of being practiced or carried out in other various ways. Also, it is to be understood that the terminology and phraseology employed herein is for purpose of description and illustration and should not be regarded as limiting. Like reference numerals are used to indicate like components.

DESCRIPTION OF THE ILLUSTRATED EMBODIMENTS

Figure 1:
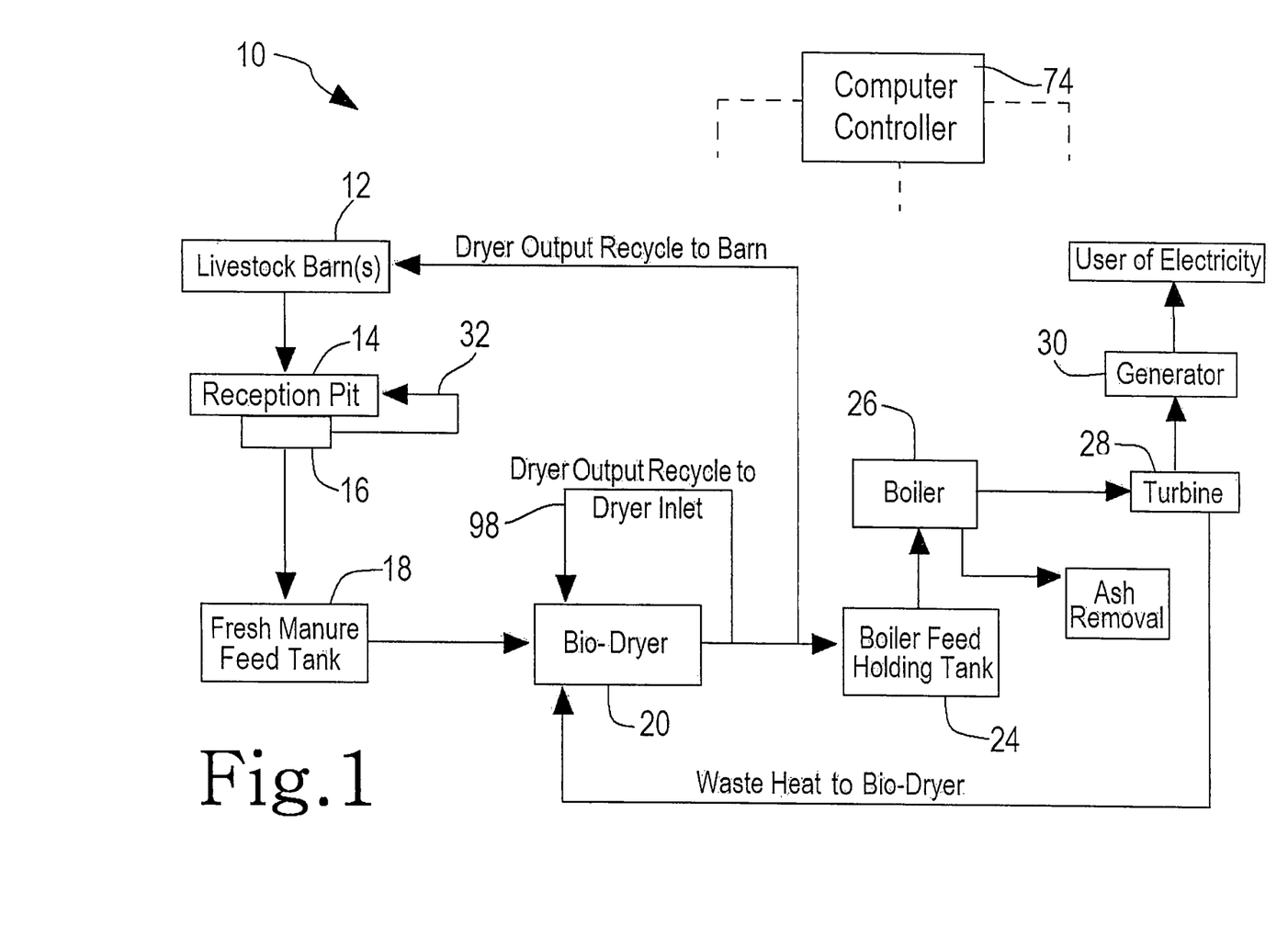
FIG. 1 shows a flow diagram of the process of the invention.

Referring to FIG. 1, in an exemplary manure management system 10 of the invention, the manure, at about 86% by weight water and 14% by weight solids, is collected at the originating source, such as a livestock barn 12, and conveyed to a reception pit 14. From reception pit 14, the manure is pumped, through a chopper pump 16, to one or more fresh manure feed tanks 18. From feed tank 18, the manure is pumped into a bio-dryer 20 where the moisture content is reduced, by water evaporation, from about 86 percent by weight water to about 40 percent by weight water. In the process, the total mass of the manure product is reduced, by water evaporation, by about 77 percent. Bio-dryer 20 has an aerated floor and first and second mixers such as augers 22 (FIG. 2) which mix the manure so as to facilitate drying of the manure, and to develop consistency in texture and moisture content of the dried manure product. The mixers optionally also introduce additional air into the mass of the manure product during the drying process, either through the auger, or by entrainment of the air as a result of the mixing activity.

From bio-dryer 20, the dried manure product is fed, as a solid fuel, to a boiler feed holding tank 24. The dried product is fed from tank 24 into a conventional solid-fuel boiler 26 as needed to sustain a desired level of combustion in the boiler, and is burned in the boiler, thereby to produce heat in boiler 26.

The burning in boiler 26 includes a thermal gasification component which results in a combustion by-product which is a bone dry ash having relatively inert properties.

In anaerobic digestion of manure, not of the invention, gases are generated from the manure using super-atmospheric pressures. The so-collected gases are fed to a gas turbine, and are combusted in the gas turbine.

By contrast, as used in the invention, "thermal gasification" indicates that the high temperature in boiler 26 generates gases in the boiler, from the dried manure fuel. While small and incidental quantities of ammonia gas are produced in dryer 20 at the atmospheric working pressure of the dryer, no significant quantities of combustible gases are produced before the manure product reaches boiler 26. Thus, all vapor products of dryer 20 can be readily vented to the atmosphere.

Figure 2:
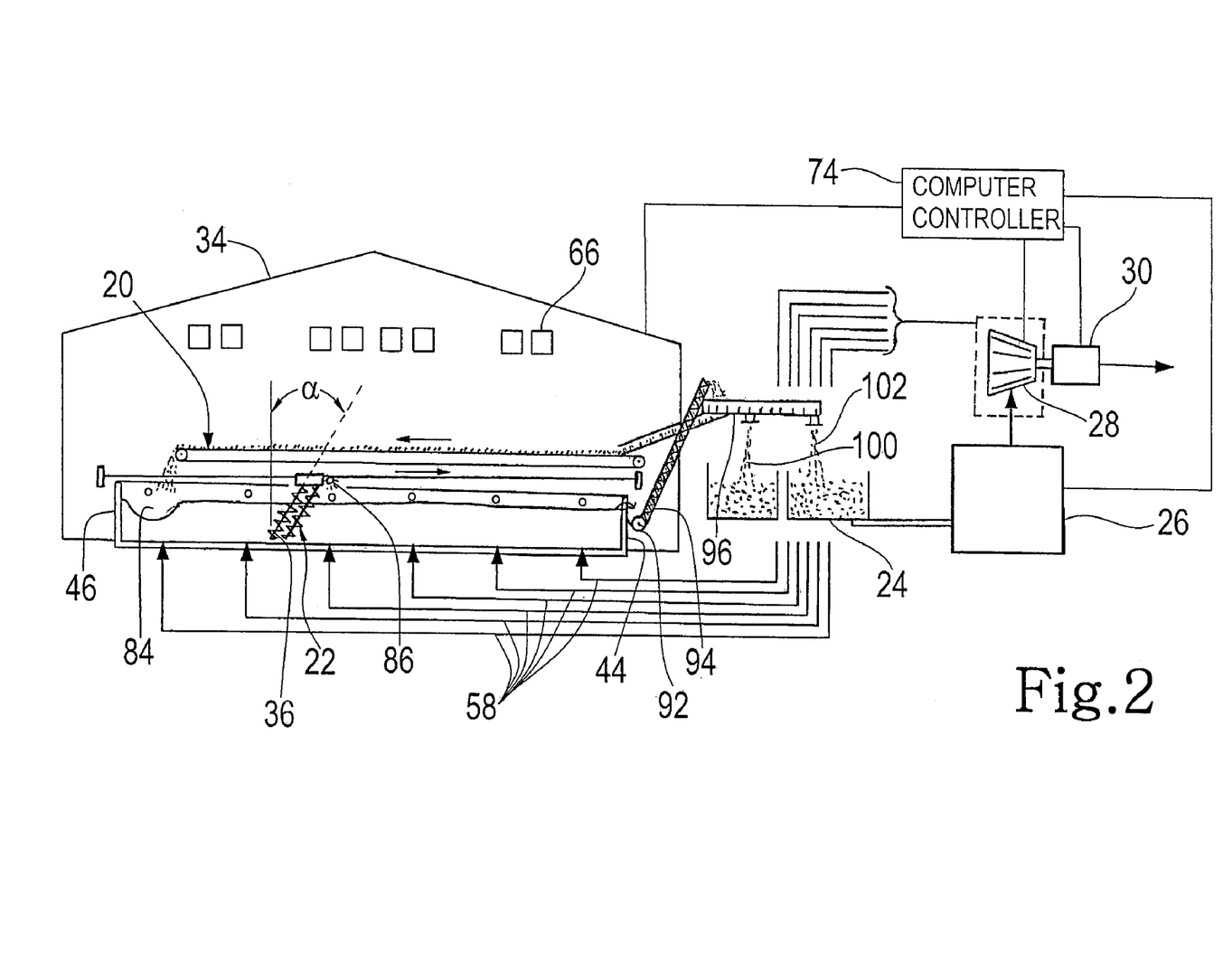
FIG. 2 shows a representative side elevation view of the bio-dryer, along with representations of the boiler, the turbine, and the generator.

Those gases which are produced in the boiler, as well as the solid portion of the e.g. manure fuel, are burned in the boiler. Accordingly, no super-atmospheric pressure need be used in the invention to produce the combustible fuel which is burned in boiler 26. And no quantity of gases is produced in the dryer which would have to be captured for environmental purposes. Rather, the fuel produced by dryer 20 is a solid fuel, produced using atmospheric pressure, whereby dryer 20 is open to ambient air e.g. by openly venting building 34 as at fans 66.

The heat generated in boiler 26 is used to create steam, which in turn is passed through a steam turbine 28. The mechanical shaft output of the steam turbine is connected to the mechanical input of generator 30, which uses the mechanical shaft output of the steam turbine to rotate the generator core, thereby to generate electricity.

The low pressure exhaust steam from the steam turbine is used to heat the air which passes through the aerated floor, and may be used to heat air, if any, which is expelled through mixers 22, as well as to provide heat for e.g. milking parlor operations or other uses in e.g. the livestock and/or farm operation.

As indicated by the above description, this invention provides a continuous process for bio-digestion and/or drying of the entirety of the manure feed stream which is collected e.g. from the livestock barn.

In a bio-drying system of the invention, as soon as the manure is collected, the fresh raw manure is immediately transported from the feedlot operating site, or other livestock holding area, e.g. a livestock barn 12, to a reception pit 14.

As desired, other bio-laden waste water streams may also be directed to the reception pit, so long as the resulting feed stream mixture contains sufficient combustible heat value to drive off the resulting water content.

A plurality of agitators, not shown, are distributed about the projected area of each reception pit. Such agitators continuously agitate the raw manure, e.g. creating respective vortices within the liquidous pool mixture of manure, and optionally other waste water feeds, thereby ensuring ongoing exposure, to air, of the liquidous manure-laden feed stream mixture.

From the reception pit, the manure-laden feed stream mixture is pumped, by chopper pump 16, to an agitated feed tank 18. In such pumping process, the chopper pump comminutes relatively larger particles or clumps of material in the manure-laden feed stream mixture such that the resulting feed material in feed tank 18 is generally free from solids particles which quickly settle out of the liquidous feed material. The liquid content of fresh raw manure is approximately 86 percent by weight water, and so is quite fluid. Addition of other feed streams can dilute the feed material to as much as 95 percent by weight water. Adding only the milking parlor waste water stream results in a feed material composition of about 92 percent by weight water. Other feed waste water streams can be added to bring the water content to e.g. about 94% to about 95% water. In general, a wide variety of biomass feed materials, up to about 95% by weight water can be successfully processed through systems of the invention, and yield sufficient heat of combustion to be energy independent so as to carry at least the heat load of dryer 20.

As part of the pumping operation at pump 16, about 50 percent to about 60 percent by volume of the output of pump 16 is returned in a recycle stream 32 to the reception pit. The process of returning the recycle stream to the reception pit entrains additional air into the combination of the recycle stream and the body of manure material in the reception pit, thus to better assure a fully aerobic environment in the reception pit.

Dryer 20 processes, dries the feed material in a continuous operation. As a given quantity of finished, dried manure product leaves the dryer, additional manure-laden feed material is added to the dryer. The fresh manure-laden feed material is pumped from feed tank 18 to bio-dryer 20, where the feed material is dried, e.g. by evaporation of water, to 40 percent by weight water content.

From the bio-dryer, the dried manure-laden product is, in general terms, transported to holding tank 24. From holding tank 24, the dried product is transported to, and is burned in, a thermal biomass solid-fuel furnace such as boiler 26.

The residual solid ash by-product of the combustion in boiler 26 represents about 2 percent by weight of the solid component of the manure-laden feed material. The ash percent will, of course, vary depending on the composition of the manure feed stream, which can vary e.g. from livestock operation to livestock operation, as well as varying over time in a given livestock operation. Such small mass of ash by-product can be economically disposed of.

The heat generated in the boiler is used to generate steam. The steam is used to drive turbine 28 which, in turn, drives electrical generator 30. Accordingly, the mechanical shaft power of turbine 28 is converted to electrical energy.

Where the energy content of the feed stream is low, e.g. where the water content is relatively higher, substantially the entire output of boiler 26 may be needed, and thus may be used, to evaporate water in dryer 20. In instances where the heat of combustion available in the dried product exceeds the heat demand of the dryer 20, the excess heat is converted to other uses, such as electricity generation using turbine 28 and generator 30. In the embodiments illustrated herein, sufficient heat is available to drive turbine 28 and generator 30 as primary energy recipients, such that the residual heat from the turbine is sufficient to satisfy the heat load of the dryer. Those skilled in the art are well versed in matching the demand of dryer 20 against energy availability at boiler 20, thus to provide energy to other energy users such as turbine 28, generator 30, thereby to consume substantially all of the available energy which is released in boiler 26.

Following is a more detailed explanation of the overall process of the invention on an exemplary dairy farm where the following design criteria are used.

Size of CAFO=2,650 cows.

Cows generally consume 42 lbs. (19 kg) of dry matter per day.

Cows generally produce 16 lbs. (7 kg) of dry manure per day.

Fecal manure is typically at 14% solids, 86% moisture as it leaves the cow. Thus, total wet weight of manure per day is 114 lbs (52 kg) per day per cow. When combined with normal amounts of urine and routine wash water used to flush manure, and normal amounts of milking parlor grey water, the resulting manure-laden feed stream to the reception pit is about 8 percent by weight solids.

Such feed stream contains about 7,000 BTU's per bone dry pound, which heat can be released by burning the so-dried manure mixture.

Manure is collected from the animal housing area at intervals sufficiently frequent that odor-developing anaerobic processes are avoided. Collecting the manure at no more than 2 hour intervals is effective to avoid, or substantially suppress, anaerobic-developed odors. Accordingly, in the invention, manure is collected, and removed from the barns, at least every 2 hours.

The collected manure is transported to one or more concrete reception pits 14 which are either in, or connected to, the respective barns. In the reception pits, the manure is continuously agitated so as to maintain an aerobic environment in the reception pits, thereby to suppress growth of odor-producing bacteria. Any anaerobic activity which has begun, before the manure reaches the reception pit, is effectively suppressed once the manure is aerated in the reception pit. Thus, a minimal amount of odor may be present in the reception pit by virtue of odor already emanating from newly-received manure as that manure arrives at the reception pit. However, such odor emanation stops once the manure becomes aerated by the action of the aerating activity in the reception pit.

The manure-laden feed stream is pumped from reception pits 14 to agitated feed tank 18, using a chopper pump as at 16, which comminutes any oversize particles in the feed stream, so as to ensure passage of the feed stream through the pipe which connects reception pit 14 to feed tank 18 and to control settling of solids in tank 18. The agitated feed tank 18 can be adjacent to, and/or integral with, bio-dryer 20. An exemplary agitated feed tank is approximately 10 feet wide, 8 feet high, and 120 feet long. The feed tank and the bio-dryer are optionally housed in an enclosed ventilated building illustrated at 34 in FIG. 2.

The manure is pumped from the agitated feed tank into the bio-dryer.

In some embodiments, a hollow elongate cavity, not shown, extends from the butt end of the longitudinally-extending shaft 36, of the auger, along the length of the shaft, and feeds to exits at the edges of the auger flights. Augers having such elongate cavities are available from Jeesung Engineering, South Korea, under the name Jeesung JS 2000. A typical such auger has maximum nominal flight diameters on the order of about 8 inches to about 18 inches, optionally about 10 inches to about 15 inches diameter. The feed stream is pumped through the hollow cavity in the auger and out the exit holes in the flights. The hollow auger system thus serves dual purposes, both as a feed mechanism which can feed the raw manure into the bio-dryer, and as a mixer.

In the bio-dryer, the moisture content of the feed stream, which is about 86 percent to about 95 percent by weight water when fed to the dryer, is reduced to about 40 percent by weight water as the dried material leaves the dryer. The water content of the dried product can be selected by the user, more than 40% or less than 40%, so long as the resulting product has enough combustible energy content to provide for the heat load demand of dryer 20.

An exemplary bio-dryer is 35 feet wide, 8 feet high and 120 feet long. The bio-dryer has air ducts located generally at the floor of the dryer. The air ducts convey heated air upwardly from the floor. The heated air is warm enough to quickly heat the incoming raw manure-laden feed stream material to 160 degrees F., and to maintain the 160 F temperature in the manure bed throughout the drying process. The 160 degree F. temperature kills all of the pathogens in the manure, within minutes. Heating the air so as to maintain the air temperature, in the manure bed, at the recited 160 degree F. temperature, enhances the water carrying capacity of the air, thus enhancing the ability of the upwardly-percolating air to absorb water, and remove the water from the bed of manure, thereby to enhance the drying capacity of the dryer. Namely, heating the air enhances the water absorption capacity of the air as well as the water absorption rate of the air, such that the air exiting the top of the manure bed is heavily laden with humidity.

Heated air is also blown into the air-feed cavities, if any, in augers 22 when manure is not being added to the dryer.

Figure 3:
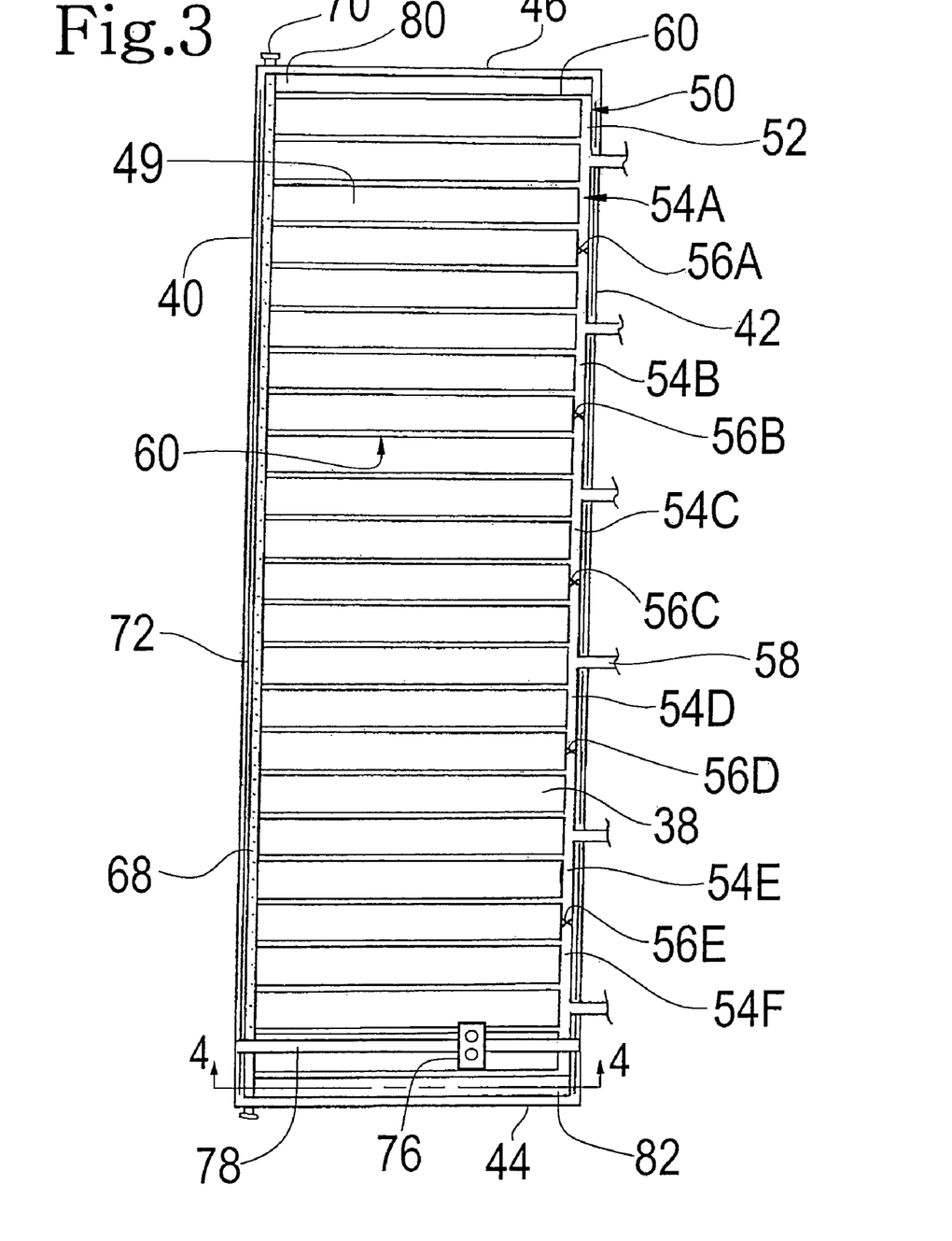
FIG. 3 shows a representative top view of the floor plan of the bio-dryer.

An exemplary dryer 20 has a solid concrete floor 38, upstanding left 40 and right 42 concrete side walls, a feed end wall 44, and an exit end wall 46. FIG. 3 shows a top view of the floor structure 48 of an exemplary dryer 20. Floor structure 48 includes floor 49, and an air manifold system 50 which feeds heated air to, and upwardly through, the bed of manure which is being dried in dryer 20. Manifold system 50 includes a header 52, which extends along substantially the full length of dryer 20. Header 52 is separated into six header zones, which are generally designated as 54A, 54B, 54C, 54D, 54E, and 54F, by five respective separators 56A, 56B, 56C, 56E, and 56E, thus to define corresponding drying zones in bed 62 of manure, which drying zones generally overlie the respective header zones. Each zone of header 50 is fed by a separate incoming feed pipe 58, and distributes the feed stream to a separate set of percolation tubes 60. The percolation tubes extend from header 52 across substantially the full width of the dryer.

Feed pipes 58 and header 52 are generally imperforate pipes, e.g. PVC pipe. Percolation tubes 60 are perforated e.g. PVC tubing about 2.5 inches nominal diameter. Sizes of percolation tubes 60, header 52, and feed pipes 58 are selected to collectively carry the desired quantity of heated air for the desired rate of mass flow at a desired gauge pressure inside the manifold system. The gauge pressure may be consistent throughout the combination of header 52 and percolation tubes 60.

Percolation tubes 60 are closed on the ends thereof which are distal from header 52, and are open to header 52. Thus, any air which is fed into the percolation tubes from header 52 must exit the percolation tubes through the holes which extend through the sidewalls of the tubes.

By properly selecting pipe sizing in the air manifold system, and sizes and number and locations of the holes in the percolation tubes, a static pressure can be set up in the percolation tubes such that a generally constant pressure differential is maintained between the inside of the tube and the outside of the tube, and wherein the pressure differential is consistent along the length of a given percolation tube. Accordingly, pressurized air which is fed into the header in a given header zone is distributed evenly to all of the percolation tubes in that header zone. A consistent gauge pressure is maintained along the length of a respective percolation tube; and the pressures in all of the tubes, in a given header zone, are about the same.

If desired, the separators 56, which separate the respective header zones from each other, can be partially opened in order to modify what might otherwise be gross differences in pressure between respective adjacent header zones, thus to graduate and attenuate differences in air flow rates between corresponding ones of the dryer zones.

Figure 4:
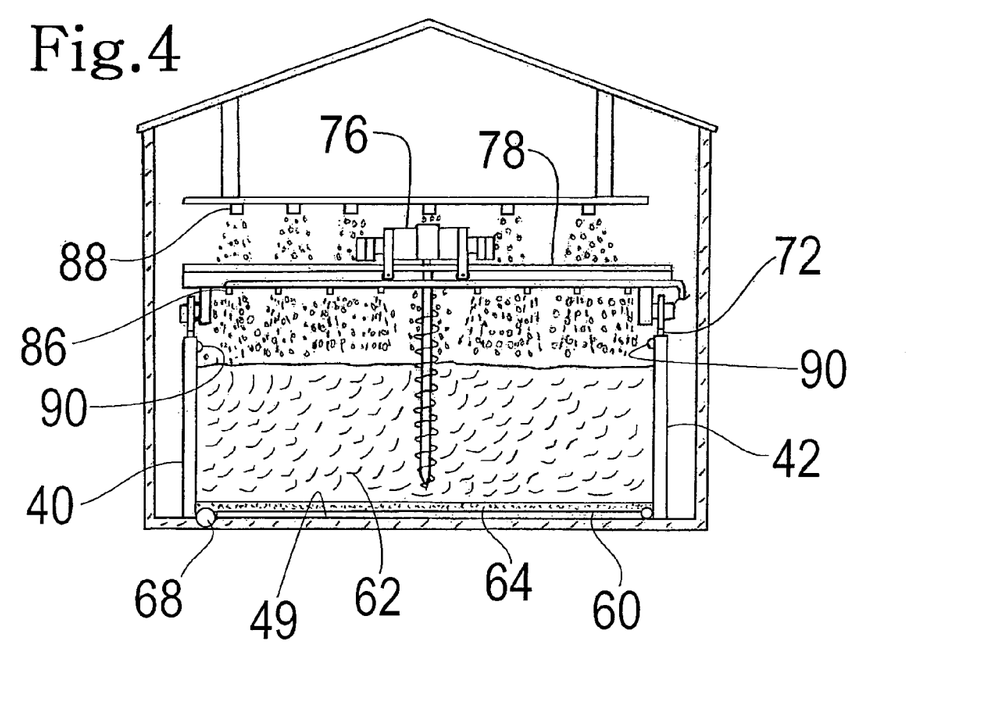
FIG. 4 shows a representative cross-section view of the bio-dryer and is illustratively taken from the location 4-4 of FIG. 3.

FIG. 4 shows the dryer in elevation cross-section, with a load of manure 62 being dried. As seen in FIG. 4, the e.g. 2.5 inch percolation tubes 60 are overlaid by a layer of gravel 64, e.g. pea gravel, to a total depth of about 8 inches above floor 49 of the dryer. Thus, the gravel extends upwardly above the percolation tubes by about 5-6 inches. The manure directly overlies the gravel and is in contact with the gravel.

A supply of heated air is fed through the air manifold system at a gauge pressure of about 5-10 inches of water. At such low air pressure, the air can be thought of as seeping out of the percolation tubes, and slowly moving laterally and upwardly within the gravel bed, thus to generally establish, within each zone, a generally consistent level of air pressure, about the projected area of the gravel bed in that zone. The heated air percolates slowly upwardly through the manure bed, aerating the bed, and collecting humidity from the bed. By the time the air exits the manure bed, at the top of the bed, the air is saturated with moisture and the temperature of the air and the temperature of the bed are about the same. As heated air is continuously provided to this continuous dryer through tubes 60, the temperature of the manure bed is raised as needed to the desired 160 F level, and is maintained at the 160 F level throughout the drying process in dryer 20.

The moisture collected by the percolating air is entrained in the air e.g. as relative humidity, as the air leaves the bed, and is removed from building 34 by continuously drawing a fresh supply of air through the building using e.g. fans 66.

As is discussed in detail hereinafter, relatively dry material is added to the dryer at the feed end 44 of the dryer in combination with the addition of the raw manure feed stream at the feed end, as the raw manure feed stream is being deposited in the dryer. Such addition of dry material in admixture with the liquid feed stream absorbs most of the free liquid in the feed stream. However, some free liquid may remain, especially in the feed area of the dryer.

Liquid collection tube 68 is a perforated e.g. PVC pipe which extends along substantially the full length of dryer 20 adjacent left side wall 40, and extends outside dryer 20 on one or both ends. Collection tube 68 may be recessed into or below the top surface of floor 49, or the floor may be pitched toward tube 68, so that free liquid which reaches the bottom of dryer 20 flows by gravity into tube 68.

Collection tube 68 is closed on both ends, thus to preserve the air pressure at the bottom of the dryer and adjacent the air feed system. Free e.g. raw manure feed liquid which settles to the bottom of dryer 20 thus flows into tube 68 through the openings in the side wall of tube 68. Periodically, an end cap 70 on the collection tube is removed, and the collected liquid is drained from the tube. Since the quantity of free liquid which collects in tube 68 is rather small, the collection tube can be drained rather infrequently, such as every week or so. The frequency of draining is established according to the quantity of liquid which collects in tube 68 and can be different for different feed stream compositions.

The heated air, which exits the air ducts through holes in the respective percolation tubes 46, percolates upwardly and laterally through the gravel bed, and thence upwardly through the bed of manure which overlies the gravel bed. As the heated air passes upwardly through the bed of manure, heat is transferred to the manure in maintaining the temperature of the manure at the desired temperature of 160 degrees F. or greater. At the same time, the air absorbs moisture from the bed of manure, thus drying the manure-laden feed stream to the recited exit moisture level of about 40 percent by weight water.

Overall operation of the manure management system 10 is controlled by a computer controller 74, such as a programmable logic computer or a personal computer.

Augers 22 rotate in directions whereby the auger flights generally lift, mix, and turn the manure. The process of achieving uniform texture and moisture in the resulting dried manure product is assisted by the mixing of the manure by augers 22. Augers 22 are generally supported from rails 72 which are mounted on the side walls of dryer 20, and run the length of the dryer.

Augers 22 are mounted on an auger head 76 which is mounted on a trolley 78 which rides on rails 72. Rails 72 accommodate movement of trolley 78 along the length of dryer 20. Trolley 78 accommodates movement of auger head 76 back and forth across the width of the dryer. Thus, rails 72 and trolley 78 collectively, along with respective drive systems, provide for movement of augers 22 to any desired location within the length and width of the dryer.

Computer controller 74 is programmed to instruct movement of the auger head in a desired pattern of movements so as to periodically effect mixing of the bed of manure at substantially each and every location along the length and width of the dryer.

For example, and referring to FIG. 3, to start a mixing cycle, the trolley is driven to its start position 80 at the feed end 44 of the dryer, with auger head 76 driven to the left side 40 of the dryer, whereby the augers are at the upper left corner of the dryer according to the dryer receptacle layout shown in FIG. 3. From the start position, the augers are activated, e.g. rotated, and heated air is started flowing through the shaft/flight cavities in the augers. With the augers rotating, with heated air being pumped through the augers, and with heated air being percolated up through the bed from the air manifold system, auger head 76 is driven along trolley 78 toward right side 42 of the dryer.

When the auger head reaches its maximum locus of travel toward right side 42, which is proximate right side 42, so as to mix the manure adjacent right side 42, movement of the auger head relative to trolley 78 is stopped, rotation of augers 22 is continued, and the trolley, itself, is driven longitudinally along rails 72 toward exit end 46 of the dryer.

Trolley 78 is driven a distance sufficient that, during the next pass of travel of the auger head 76 toward left side 40 and along trolley 78, the area of the manure which is being mixed reaches far enough toward feed end 44 to ensure that all manure between the previous rightwardly-directed pass, and the current leftwardly-directed pass, is effectively agitated and/or mixed so as to ultimately provide for the desired amount of uniformity of texture and moisture content.

When the auger head reaches the limit of its movement leftward, adjacent the left side of the dryer, the trolley is again indexed a desired distance toward exit end 46 and the auger head moves toward the right side, all the while continuing rotation of auger 22. The auger head and augers thus continue back and forth movement across the width of the dryer, at a generally constant horizontal speed, with accompanying longitudinal indexing of the trolley, until the auger head reaches the cycle finish position 82.

In an exemplary dryer, the traverse of auger head 76 from start position 80 to finish position 82 requires multiple left and right indexed passes, and takes about 90 minutes to about 120 minutes, optionally about 105 minutes. Different cycle times can be used, depending on the properties of the bio-mass material which is being dried and the amount of drying desired. The mixing effected by augers 22 turns the manure or other bio-mass material into a finished product which can be characterized as aerotropic compost, before burning. Indeed, the finished product can be used for enhancement of soil fertility and texture where the nutrient load in the soil is less than optimal.

The manure bed in the dryer is continually monitored for temperature, moisture content, and carbon to nitrogen ratio (C/N). The process keeps the manure at or proximate the following target conditions:

Temperature—160 F generally throughout the dryer, allowing for initial warm-up;

40% by weight water, alternatively 60% by weight solids, in the finished product; and C/N ratios between 20:1 and 40:1; with a target of 30:1.

The temperature is somewhat controlled by natural fermentation, and is assisted by the heated air which is percolated upwardly from the percolation tubes, as well as heated air, if any, from the augers if the augers have the suggested cavities and air passages.

The dryer is optionally enclosed by a 55 foot wide by 120 foot long building 34. The ventilation of the drying process building is effected by fans 66 and corresponding fresh air intake louvers, not shown. Fans 66 provide sufficient air handling capacity to provide at least one air exchange per minute inside building 34.

As the manure in the dryer loses moisture, that manure material which contains lesser amounts of moisture, and thus is relatively lower in density, rises toward the top of the manure bed. Thus, the density of the manure bed generally varies top-top-bottom, with generally greater densities toward the bottom, lesser densities toward the top.

When the material at and adjacent the top of the bed is at about 40% by weight moisture content, the material at the top of the manure bed is skimmed off onto a transport conveyor, not shown, by e.g. a leveling screw conveyor or other skimmer, also not shown. The transport conveyor transports the dried manure to boiler feed holding tank 24. From tank 24, the dried manure is fed to boiler 26 in accord with the fuel needs of boiler 26, where the dried manure is burned.

As the dried manure product is burned, heat is generated at the rate of about 7000 btu per bone dry pound of solids in the dried manure product. The amount of ash left over from the combustion process is about 2% by weight based on the bone dry weight of the dried manure product. The ash is relatively inert and can be used for fertilizer. The ash is conveyed to an ash storage trailer for shipping, or to other ash receptacle, for shipping.

In the embodiment being illustrated, the heat from the boiler is used to generate steam. The steam is fed to turbine 28 at e.g. 250 psig and is exhausted from the turbine at e.g. 1.5 psig. The exhaust steam is sent to heat exchangers where it is used to heat ambient air, thereby to provide hot air which can be conveyed through manifold system 50 and which can be used as the drying heat which percolates up from the floor, and through the manure bed in dryer 20. Some of the heat from the steam exhausted from turbine 28 can also be used to heat parlor water, to heat air being ducted through the augers, and/or to moderate the temperature of fresh air which is used as make-up air in building 34.

In the example illustrated, which operates with 2650 cows, electricity may be produced at the rate of at least 400 KW/H. The electricity can be used on the farm, and any excess can be sold into the national electrical grid system.

In the embodiments illustrated by FIG. 3, wherein the augers are oriented vertically, and wherein the dried manure product is skimmed off the top of the manure bed, moisture level in the manure bed in the dryer varies vertically. Namely, the wettest material is near the bottom of the bed, while the driest material is at or near the top of the bed. As material dries, and is mixed by augers 22, the lifting of the material by the augers causes the relatively drier material to gradually move toward the top of the bed. Thus, the lifting and mixing effected by the augers results in the above-recited density gradation, whereby the driest material can be skimmed off by the leveling conveyor. The function of the augers is to mix the manure in the bed, including to lift the manure, optionally to add replacement material into the bed, and optionally to inject heated air into the bed.

In such embodiments, raw material feed to the manure bed is distributed generally uniformly about the projected surface area of the bed. Similarly, the diluting dried recycle material is also generally uniformly distributed about the projected surface area of the bed, at the same locations and at the same times, as liquidous manure-laden feed material is being added to the bed.

FIG. 3 suggests an embodiment wherein the augers 22 are oriented vertically with respect to the floor of the dryer. While FIG. 4 is generally taken at the location indicated in FIG. 3, FIGS. 2 and 4 generally represent a second embodiment of implementation of augers 22 wherein the augers are inclined at an angle a of about 10 degrees to about 50 degrees with respect to the vertical, with the upper end of the auger closer to the exit end of the dryer than to the feed end.

Typically both augers are oriented at a common angle, though the angles of the augers, e.g. the shafts of the augers, may differ from each other. Where the augers are inclined at an angle a which differs from vertical, such as the recited 10 to 50 degrees from vertical, when a particle of manure is picked up by a rotating flight, the particle is carried by the flight in its rotation, and the particle is advanced upwardly along the length of the auger shaft and toward the exit end of the dryer; and ultimately the particle is dropped from the rotating flight. In the alternative, a particle under the surface of the bed is moved longitudinally in the bed by the mere force of rotation and the configuration of the auger flighting. Accordingly, the orientation of the auger enables the auger to perform the function, in addition to lifting and mixing, of moving the manure longitudinally along the length of the dryer.

Through multiple cycles of the augers through the manure bed, the manure is gradually moved longitudinally from the inlet end of the dryer to the exit end of the dryer. A dry quantity of the manure can be removed from the dryer by a final lifting by the auger flights as the auger head, and thus the augers, make the end pass at the exit end of the dryer. In an exemplary embodiment, where the augers move in 105 minute cycles, where the dryer is 120 feet long, the manure feed stream traverses the dryer, and leaves the dryer at 40% moisture, in a period of about 2.5 days, namely about 60 hours.

By using the augers as a longitudinal transport mechanism, the skimming conveyor, for finished product removal, is obviated. In addition, by using the augers as a longitudinal transport mechanism, the moisture profile in the dryer changes from a vertically-varied profile in the first-described embodiments, to a generally horizontally-varied profile. Namely, the moisture level in the bed is highest at the feed end of the dryer, and progressively decreases from the feed end toward the exit end. Such longitudinal variation in moisture level is generally a result of the fact that the manure material is moved in a direction away from the feed end of the dryer toward the exit end, with each cycle of the augers. Thus, material closer to the exit end has, in general, been in the dryer, and has been drying, for a longer period of time than the material closer to the feed end.

As the augers make their pass adjacent the inlet end of the dryer, the material relatively closest to the feed end is picked up and moved a distance of e.g. about 1-3 feet toward the exit end of the dryer, leaving a trough 84 extending across the width of the dryer in the wake of the augers. At the beginning of the next cycle, fresh raw manure is sprayed into the trough, from nozzles 86 mounted on trolley 78. At about the same time, optionally simultaneously a recycle stream of dried manure from the exit end of the dryer is also applied in the same trough through dry material applicator nozzles 88, such that the wet raw manure and the dried manure product are commingled with each other in the process of filling trough 84.

Since the augers tend to pick up the manure particles and transport them longitudinally in the process of mixing the manure, some of the manure particles may be exposed to ambient air for a longer period of time than where the augers are oriented at a vertical angle. Accordingly, there is less need for air to be injected by the augers into the manure mass. Accordingly, the augers, where inclined from vertical, need not be hollow augers, whereby conventional mixing augers can be used.

The wet manure applicator is mounted on trolley 78. The dried manure applicator is fixedly mounted to the building, such as being suspended from the ceiling or mounted to, and extending upwardly from, the floor. In any event, the wet 86 and dried 88 manure applicators apply their respective materials across substantially the full width of the dryer adjacent the inlet end of the dryer. FIG. 4 illustrates the simultaneous addition of wet and dry manure feed streams. Since, with the inclined auger orientation, the feed material is always added in the same location in the dryer, either or both applicators can be fixedly mounted; or either or both applicators can be movably mounted.

In general, the volume of dried manure product applied in trough 84 is about equal to the volume of the raw wet manure feed stream applied in trough 84, thus to fill up trough 84. The purpose of the dried manure product is to quickly pick up and immobilize most of the free liquid in the raw manure product, thus to limit the amount of liquid which is drained off through collection tube 68. By binding the free liquid into the manure mass, the water associated with the free liquid can be held in the mass so as to be driven off by evaporation while the solids associated with the free liquid is fixedly held by the physical activity of e.g. the dried manure recycle material.

In addition, with the use of the dried recycle material, the overall moisture fraction by weight of the manure bed adjacent the inlet end is quickly reduced from the e.g. 86%, or 92%, or 94% or 95% by weight level in feed tank 18, to a lesser overall water content. The resulting water content might be as low as about 65% to about 75% by weight water.

In instances where wetter feed material is used, e.g. 92% or 94% or 95% water, the water content of the wet and dry mixture at the feed end of the dryer can be as high as about 80% to about 83%, or 84% by weight water. Thus, the feed end mixture, including wet plus dry components, can be anywhere in the range of about 65% to about 85% by weight water.

The resulting mixture typically has little if any free liquid, and thus is not usually a liquidous mixture. In addition, the freshly-added material, wet and dry, is expeditiously mixed by augers 22, during the feed material addition, with the pre-resident material adjacent feed end wall 44, which has already been partially dried according to its pre-existing residence time in the dryer.

Thus, any free liquid which manages to drain through, or not mix with, the dried recycle stream material, as it drains downwardly, next encounters the pre-resident material, and is largely immobilized by its contact with the pre-resident material. Thus, the free liquid in the feed material from tank 18 is largely immobilized by the combination of the dry recycle feed material and the partially-dried pre-resident material which was already resident in the dryer adjacent the feed end of the dryer.

Given that the moisture content of the manure in the dryer decreases from the feed end to the exit end, given that it is desirable to control the moisture content leaving the dryer, given that the raw manure feed to the dryer is a variable material, and that uniformity of feed material to the boiler is desirable, it is desirable to be able to control the rate and predictability of the moisture reduction in the manure bed, namely to control the differences in the moisture content of the manure bed along the length of the dryer. By contrast, in a vertically-variable moisture bed, it is desirable that the manure bed be longitudinally and laterally consistent in moisture and temperature content throughout the projected area of the bed, consistent with the vertical variations in moisture in the bed.

Control of horizontally-measured moisture and temperature differences can be achieved by defining dryer zones of the projected area of the manure bed, in terms of the underlying air manifold system. Thus, the air manifold system is divided into a number of specific zones of control as indicated earlier, namely indicated as six zones 54A, 54B, 45C, 54D, 54E, and 54F in the illustrated embodiments. Namely, the respective zones are defined by separators 56A, 56B, 56C, 56D, and 56E. The separators can be simple baffles in header 52, or can represent individual headers associated with each zone, rather than a common header with dividers in the header. As another alternative, header 52 can be a single unit and the separators can be valves which are controlled by computer controller 74. Such valves can be full open, full closed, or any variant between closed and open. In general, the valves are closed, thus to isolate the respective zones from each other. In the illustrated embodiments, there are six zones, displaced from each other along the length of the dryer. Any desired number of zones can be provided.

In a dryer where the moisture is vertically-graduated, the respective zones are used to assist in maintaining horizontally-consistent moisture levels throughout the projected area of the bed. By contrast, in a dryer where the moisture level is horizontally-graduated, the dryer zones are used to assist in maintaining different moisture levels in each dryer zone, with the moisture levels progressively decreasing from the inlet end of the dryer to the exit end of the dryer.

First and second non-contact moisture sensors 90 are mounted on side walls 40 and 42 of the dryer in each zone, thus to give at least two moisture readings in each zone. Suitable non-contact, microwave-based moisture sensors are available as Micro-Fluid LB455, from Berthold Technologies, Oak Ridge, Tenn.

The moisture in each zone is monitored by computer controller 74. Where the moisture is higher than a target level in the respective zone, additional heated air is provided to the manure in that zone through manifold system 50. Where the moisture is lower than a target level in the respective zone, the air flow through manifold system 50 is decreased in that zone. As desired, e.g. to prevent substantial differences in air flow rates between adjacent zones, valves e.g. 56A or 56B, at the zone boundaries can be left partially open thus to provide for limited bleed of air between zones where the air pressure between adjacent zones differs.

With the augers inclined as illustrated in FIG. 2, raw feed material is fed into the process at the feed end, and finished product exits the dryer at the exit end, whereby the feed end and the exit end are generally characterized by functions which correspond to the monikers used in naming them.

At the exit end of the dryer, the exiting material is collected in horizontal collection conveyor 92, and is fed to elevating conveyor 94, thence to horizontal transport conveyor 96. Conveyor 96 releases a first dryer recycle stream 98 to the dryer inlet, deposits a second fraction of the dried product, as a second recycle stream 100, in a receptacle for return to the livestock barn for use as animal bedding, and deposits the remainder portion stream 102 of the dried manure product in boiler feed holding tank 24.

The bedding deposit functions as a recycle stream because the bedding take-off stream is sent back to the reception pit after again being used, and soiled by the livestock bedded therein, in the barn.

The invention provides two substantial benefits as compared to conventional systems which produce only a dirty bio-gas, a dirty effluent, and a wet solid cake. First is the great volume reduction of manure, ultimately leaving only the ash, as the manure passes through the process.

As desired, grey water from the milking parlor can be combined with the manure feed steam, whereby the apparatus and process illustrated in the invention can also be used to manage the waste water stream which is generated in the milking parlor.

An exemplary combined stream of manure and milking parlor waste water produces a feed stream to dryer 20 which is about 8% by weight solids and about 92% by weight water. Overall, system 10 removes the water by evaporation, and feeds the resulting e.g. 60% solids product to the boiler. Accordingly, the invention produces two primary output streams from the dryer—(1) a stream of water vapor in the form of the humidity contained in the air which leaves the dryer, and (2) the 40% moisture solids stream which is fed from the dryer to the boiler; which produces the resulting small amount of ash. Thus, the only output of the system and process of the invention, which must be disposed of, is the small amount of ash.

Table 1 illustrates the mass change in the process, illustrating the effectiveness of the invention in disposing of the manure waste, again using the 2650-cow example, and the raw manure feed at 92% water, including milking parlor grey water, representing a single-day throughput, in kilograms.

TABLE 1

|  | Total Wt | Solids | Water | Water Removed | % of Starting Water Removed |
|---|---|---|---|---|---|
| Raw manure feed | 9985 | 788 | 9197 | -0- | -0- |
| Dried manure product | 1313 | 788 | 525 | 8672 | 94% |
| Ash residue, to disposal | 16 | 16 | -0- | 9197 | 100% |

As seen in Table 1, a daily overall feed stream of over 22000 lbs. (9985 kg) is reduced to only 35 lbs (16 kg) of ash which must be disposed of outside system 10. Because the volume, and indeed the weight, of the waste material stream are reduced so much, the cost of transporting such small quantity of residual material is so small that ash transport, manure-waste transport, are no longer major factors in the economics of the livestock operation.

For those farms which are already restricted in land areas, or which have already reached an excess phosphorous status with respect to available land, the invention provides an economical alternative to additional land purchases. Namely, the farmer may not have to purchase additional land or pay extra fees for disposal in other locations. Such economic advantage can make the difference between whether or not a farm can remain economically viable.

Environmental risks are greatly reduced by use of the invention. The material being transported is a dry ash material rather than the liquid and semi liquid applications now being used. Spills are less likely to occur, and are more easily cleaned up, with a dry material and one that is not environmentally dangerous. The ash can also be pelletized or made into a slurry for easier handling.

With this invention, a concentrated animal feed operation, e.g. a feedlot, or a milking operation, is economically more feasible because, using the invention, less land is required for manure disposal. The lesser land requirement can remove one of the major barriers to new entries by individuals into the dairy farm and/or feedlot business.

Odor can be a significant concern for those living close to a field where manure is being applied. With the bio-drying process of this invention, there is little concern for objectionable odors being emitted by field applications of manure and, even in the drying process, odor emission is maintained within desired threshold levels. Namely, the aerobic process environment of reception pit 14, tank 18, dryer 20, and tank 24, and the gasification phase of the combustion process in boiler 26, result in a manure management process, and a manure product, which are relatively inert, with minimal odor.

In this system the manure is collected and transported in a liquid state, from the farm source, to dryer 20. The liquid state facilitates gravity feed and/or pumping of the manure. Thus, relatively smaller farmers who are situated in close proximity to each other can combine their respective manure outputs and use shared facilities. The technology can also be scaled down and modified such that the invention is feasible for use by relatively smaller operations, operating independently.

While the description has focused on drying the manure to a finished water content of 40% by weight water, other water contents can be obtained by adjusting the rate of drying, the temperature of the heated air, the flow rate of the heated air, the length or width of the dryer, namely the residence time in the dryer, and the like.

This invention results in the following direct economic benefits to the farmer.

1. Manure Application. Under present systems, transporting manure to nearby fields typically costs an average of about U.S. $100 per cow per year. Thus, on the exemplary farm, which manages about 2650 cows, the annual cost of manure transport amounts to approximately U.S. $265,000 per year. The invention eliminates most of this cost.

2. Bedding. Dairy producers currently buy sawdust or other bedding material. Such bedding costs can amount to approximately U.S. $35 per cow per year. The dried manure produced with system 10 can be used as a bedding material, if desired, and thus can save on bedding costs.

3. Electricity. Assuming the above mentioned 2650 cow e.g. dairy operation, the invention produces sufficient electrical energy to run the dairy operation and also produces an excess of electricity which can be sold to the local energy grid utility.

4. Residual Heat. There are numerous opportunities to utilize the residual heat produced by the system. Such residual heat can be used e.g. to heat commercial green houses or other industrial or farm applications.

In view of the above, the invention reduces nutrient contamination, especially phosphorus which results from spreading manure in farm fields. The invention, further, ameliorates the associated air pollution and odor problems, both related to on-farm digestion of the manure, and related to spreading manure in farm fields. At the same time, the invention generates positive cash flow by reducing manure management expenses for the user and providing a revenue stream from sale of electricity. The environmentally friendly ash material is easily disposed of and has value as fertilizer.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

To the extent the following claims use means plus function language, it is not meant to include there, or in the instant specification, anything not structurally equivalent to what is shown in the embodiments disclosed in the specification.

Having thus described the invention, what is claimed is:

1. A method of processing relatively wet bio-mass material, comprising:
    (a) drying a mass of wet bio-mass material by
        (i) providing relatively wet bio-mass material to be dried, as a bed of such bio-mass material over a floor of a dryer, the dryer having an inlet and an outlet, an air supply system being associated with the dryer and releasing air into the bed of bio-mass material,
        (ii) providing a supply of heated air through the air supply system to the bed of bio-mass material, thus to percolate the heated air through the bed of bio-mass material such that the air emerges from the bed of bio-mass material,
        (iii) mixing the bed of bio-mass material by applying mixing apparatus to the bed of bio-mass material while the heated air is percolating upwardly through the bed of bio-mass material, and;
        (iv) moving the bio-mass material progressively toward the outlet of the dryer whereby a relatively drier, solid-phase, first portion of the bio-mass material is generally displaced from a relatively wetter second portion of the bio-mass material in the bed of bio-mass material;
    (b) removing at least a portion of the relatively drier, solid-phase, first portion of bio-mass material as product from the dryer;
    (c) supplying at least some of the first portion of the dried, solid-phase, bio-mass material, which has been removed from the dryer, to a combustor;
    (d) burning, in the combustor, the solid-phase bio-mass material supplied from the dryer, to produce heat energy; and
    (e) converting at least a portion of the heat energy, produced in the combustor, to electrical energy.

2. A method as in claim 1, the dryer comprising a receptacle having upstanding walls, the method including containing the bio-mass material in the receptacle while supplying the heated air, moving the mixing apparatus about the bed of bio-mass material thereby periodically mixing first respective portions of the bio-mass material, and periodically moving second respective portions of the bio-mass material progressively toward the outlet of the dryer.

3. A method as in claim 1, the moving of bio-mass material progressively toward the outlet of the dryer comprising moving the bio-mass material along a generally horizontal path from proximate the inlet of the dryer where the bio-mass material is relatively wetter, toward the outlet of the dryer where the bio-mass material is relatively drier, thereby to produce the relatively drier bio-mass material product.

4. A method as in claim 1, further comprising recycling a portion of the relatively drier bio-mass material product to the inlet of the dryer.

5. A method as in claim 1, further comprising controlling air temperature and flow rate of air flowing through the bed of bio-mass material so as to control the temperature in the bed, thereby to minimize the production of combustible vapors in the dryer and to maintain the temperature of the bio-mass material below a combustion temperature of the bed of bio-mass material.

6. A method as in claim 1, further comprising sensing a moisture level of the bed of bio-mass material in the dryer, and adjusting one or more of air temperature of heated air being supplied to the bed of bio-mass material in the dryer, mass flow rate of heated air being supplied to the bed of bio-mass material in the dryer, or frequency or rate of mixing of the bio-mass material in the dryer, in response to the sensed moisture level in the bed of bio-mass material in the dryer, thereby to maintain an aerobic environment in the dryer.

7. A method as in claim 1, further comprising establishing at least first and second different drying zones in the bed of bio-mass material, and adjusting at least one of air temperature and air flow rate of the heated air to one of the first and second drying zones while not making the same such adjustment to the other of the first and second drying zones.

8. A method as in claim 1 wherein combustion in the combustor is effective to combust at least about 95 percent of the dry basis weight of the solid phase bio-mass material product provided to the combustor from the dryer.

9. A method as in claim 1 wherein bio-mass material to be dried is collected, and maintained in a retention system, under substantially aerobic conditions prior to being introduced into the dryer.

10. A method as in claim 9, further comprising continuously agitating the bio-mass material in the retention system.

11. A method as in claim 1 wherein the bio-mass material received at the dryer is about 65 percent by weight to about 95 percent by weight water and the content of the solid-phase bio-mass material removed from the dryer is about 30 percent by weight to about 50 percent by weight water.

12. A method as in claim 1, further comprising maintaining the bed of bio-mass material at a temperature, and providing sufficient air flow to the bed of bio-mass material, to maintain a substantially aerobic environment in the bed of bio-mass material.

13. A method as in claim 1 wherein the converting of heat energy produced in the combustor to electrical energy comprises generating steam in a boiler using the heat energy output from the combustor and directing the steam output from the boiler at a first pressure to a steam turbine having an electrical generator coupled to an output shaft of such steam turbine.

14. A method as in claim 13, further comprising supplying steam output from such turbine at a second pressure, lower than the first pressure, to the air supply system and thus heating the air supplied to the dryer.

15. A method as in claim 14 wherein enough steam is provided by the boiler to generate electricity sufficient to satisfy electrical power demand required to power the dryer and the combustor, and to provide all of the heat required in the dryer.

16. A method as in claim 13, further comprising venting, to atmosphere, the air emerging from the bed of bio-mass material in the dryer.

17. A method as in claim 1 wherein the mixing comprises mixing a relatively small portion of the bio-mass material at any given time, and moving the mixing apparatus throughout the bed of bio-mass material thereby to periodically bring the mixing apparatus into mixing contact with substantially all portions of the bed of bio-mass material.

18. A method as in claim 1, further comprising recycling residual heat from the electrical energy converting process and thereby providing heat to the air supply system.

19. A method as in claim 1, further comprising supplying fresh bio-mass feed material to the dryer to replenish the bio-mass material being removed from the dryer, thereby to operate a relatively continuous drying process.

20. A method as in claim 1, further comprising recycling a portion of the relatively drier, solid-phase, bio-mass material product to the inlet of the dryer.

21. A method of processing relatively wet bio-mass material, comprising:
(a) drying a mass of wet bio-mass material by
(i) providing relatively wet bio-mass material to be dried, as a bed of such bio-mass material over a floor of a dryer, the dryer having length and width dimensions, an inlet and an outlet, a stationary air supply system extending substantially the full length and the full width of the dryer at or proximate the floor of the dryer, such bed of bio-mass material having a top and a bottom, whereby the stationary air supply system is at or proximate the bottom of the bed of bio-mass material,
(ii) providing a supply of heated air through the stationary air supply system to the bed of bio-mass material at a low pressure such that the heated air percolates through the bed of bio-mass material at such a rate that a flow of high-humidity air is continually emerging from the bed of bio-mass material,
(iii) providing a supply of relatively ambient air at the bed of bio-mass material, entraining the high-humidity air in the relatively ambient air and exhausting the so-entrained high-humidity air back to the ambient atmosphere, thereby continuously removing the high-humidity air which is emerging from the bed,
(iv) mixing the bed of bio-mass material by applying mixing apparatus to the bed of bio-mass material while the heated air is percolating upwardly through the bed of bio-mass material, and
(v) moving the bio-mass material progressively through the dryer whereby a relatively drier, solid-phase, first portion of the bio-mass material is generally displaced from a relatively wetter second portion of the bio-mass material in the bed of bio-mass material;
(b) removing at least a portion of the relatively drier, solid-phase, first portion of bio-mass material as product from the dryer;
(c) burning a substantial portion of the relatively drier, solid-phase, bio-mass material in a combustor to produce heat energy; and
(d) converting at least a portion of the heat energy, produced in the combustor, to electrical energy.

22. A method as in claim 21, the dryer comprising a receptacle having upstanding walls, the method including containing the bio-mass material in the receptacle while supplying the heated air, moving the mixing apparatus about the bed of bio-mass material thereby periodically mixing first respective portions of the bio-mass material, and periodically moving second respective portions of the bio-mass material progressively toward the outlet of the dryer.

23. A method as in claim 21, further comprising recycling a portion of the relatively drier, solid-phase, bio-mass material product to the inlet of the dryer.

24. A method as in claim 21, further comprising controlling air temperature and flow rate of air flowing through the bed of bio-mass material so as to control the temperature of the bed, thereby to minimize the production of combustible vapors in the dryer and to maintain the temperature of the bio-mass material below a combustion temperature of the bed of bio-mass material.

25. A method as in claim 21, further comprising sensing a moisture level of the bed of bio-mass material in the dryer, and adjusting one or more of air temperature of heated air being supplied to the bed of bio-mass material in the dryer, mass flow rate of heated air being supplied to the bed of bio-mass material in the dryer, or frequency or rate of mixing of the bio-mass material in the dryer, in response to the sensed moisture level in the bed of bio-mass material in the dryer, thereby to maintain an aerobic environment in the dryer.

26. A method as in claim 21 wherein bio-mass material to be dried is collected, and maintained in a retention system under substantially aerobic conditions prior to being introduced into the dryer.

27. A method as in claim 26, further comprising continually agitating the bio-mass material in the retention system.

28. A method as in claim 21 wherein the bio-mass material enters the dryer at about 65 percent by weight to about 95 percent by weight water and is removed from the dryer at about 30 percent by weight to about 50 percent by weight water.

29. A method as in claim 21, further comprising maintaining the bed of bio-mass material at a temperature, and providing sufficient air flow to the bed of bio-mass material, to maintain a substantially aerobic environment in the bed of bio-mass material.

30. A method as in claim 21 wherein the converting of heat energy produced in the combustor to electrical energy comprises generating steam in a boiler using the heat energy output from the combustor and directing the steam output from the boiler at a first pressure to a steam turbine having an electrical generator coupled to an output shaft of such steam turbine, and further comprising supplying steam, created in the boiler, at a second pressure, lower than the first pressure, to the air supply system and thus heating the air supplied to the dryer.

31. A method as in claim 30 wherein enough steam is provided by the boiler, from combustion of the bio-mass material removed from the dryer, to generate enough electricity to satisfy electrical power demand required to power the dryer and the combustor, and to provide all of the heat required in the dryer.

32. A method as in claim 21, further comprising venting, to atmosphere, the high-humidity air emerging from the bed of bio-mass material in the dryer.

33. A method as in claim 21, further comprising recycling residual heat from the energy-converting process and thereby providing heat to the air supply system.

34. A method as in claim 21, further comprising supplying fresh bio-mass feed material to the dryer to replenish the bio-mass material being removed from the dryer, thereby to operate a relatively continuous drying process.

35. A method of processing relatively wet bio-mass material, comprising:
(a) drying a mass of wet bio-mass material by
(i) providing relatively wet bio-mass material to be dried, as a bed of such bio-mass material over a floor of a dryer, the dryer having an inlet and an outlet, an air supply system being associated with the dryer and releasing air into the bed of bio-mass material,
(ii) providing a supply of heated air through the air supply system to the bed of bio-mass material at a low pressure such that the heated air percolates through the bed of bio-mass material at such a rate that a flow of high-humidity air is continually emerging from the bed of bio-mass material,
(iii) mixing the bed of bio-mass material by applying mixing apparatus to the bed of bio-mass material and thereby mixing a relatively small portion of the bio-mass material at any given time, and moving the mixing apparatus throughout the bed of bio-mass material thereby to periodically bring the mixing apparatus into mixing contact with substantially all portions of the bed of bio-mass material, and
(iv) moving the bio-mass material progressively through the dryer whereby a relatively drier, solid phase, first portion of the bio-mass material is generally displaced from a relatively wetter second portion of the bio-mass material in the bed of bio-mass material;
(b) removing at least a portion of the relatively drier, solid-phase, first portion of bio-mass material as product from the dryer and supplying at least a portion of the relatively drier, solid-phase, bio-mass material, removed from the dryer, to a combustor;
(c) burning the supplied portion of the relatively drier bio-mass material in the combustor and thereby producing heat energy; and
(d) converting at least a portion of the heat energy to electrical energy.

36. A method as in claim 35, further comprising venting, to atmosphere, the high-humidity air emerging from the bed of bio-mass material in the dryer.

37. A method as in claim 35, the dryer comprising a receptacle having upstanding walls, the method including containing the bio-mass material in the receptacle while supplying the heated air, moving the mixing apparatus about the bed of bio-mass material thereby periodically mixing first respective portions of the bio-mass material, and periodically moving second respective portions of the bio-mass material progressively toward the outlet of the dryer.

38. A method as in claim 35, further comprising recycling a portion of the relatively drier, solid-phase, bio-mass material product to the inlet of the dryer.

39. A method as in claim 35, further comprising controlling air temperature and flow rate of air flowing through the bed of bio-mass material so as to minimize the production of combustible vapors in the dryer and to maintain the temperature of the bio-mass material below a combustion temperature of the bed of bio-mass material.

40. A method as in claim 35, further comprising sensing a moisture level of the bed of bio-mass material in the dryer, and adjusting one or more of air temperature of heated air being supplied to the bed of bio-mass material in the dryer, mass flow rate of heated air being supplied to the bed of bio-mass material in the dryer, or frequency or rate of mixing of the bio-mass material in the dryer, in response to the sensed moisture level in the bed of bio-mass material in the dryer, thereby to maintain an aerobic environment in the dryer.

41. A method as in claim 35 wherein bio-mass material to be dried is collected, and maintained in a retention system under substantially aerobic conditions prior to being introduced into the dryer.

42. A method as in claim 41, further comprising continually agitating the bio-mass material in the retention system.

43. A method as in claim 35 wherein the bio-mass material enters the dryer at about 65 percent by weight to about 95 percent by weight water and is removed from the dryer at about 30 percent by weight to about 50 percent by weight water.

44. A method as in claim 35, further comprising maintaining the bed of bio-mass material at a temperature, and providing sufficient air flow to the bed of bio-mass material, to maintain a substantially aerobic environment in the bed of bio-mass material.

45. A method as in claim 35 wherein the converting of heat energy produced in the combustor to electrical energy comprises generating steam in a boiler using the heat energy output from the combustor and directing the steam output from the boiler at a first pressure to a steam turbine having an electrical generator coupled to an output shaft of such steam turbine, and further comprising supplying steam, created in the boiler, at a second pressure, lower than the first pressure, to the air supply system and thus heating the air supplied to the dryer.

46. A method as in claim 45 wherein enough steam is provided by the boiler, from combustion of the bio-mass material removed from the dryer, to generate enough electricity to satisfy electrical power demand required to power the dryer and the combustor, and to provide all of the heat required in the dryer.

47. A method as in claim 35, further comprising recycling residual heat from the energy-converting process and thereby providing heat to the air supply system.

48. A method as in claim 35, further comprising supplying fresh bio-mass feed material to the dryer to replenish the bio-mass material being removed from the dryer, thereby to operate a relatively continuous drying process.

49. A method of processing relatively wet bio-mass material, comprising:
(a) drying a mass of wet bio-mass material by
 (i) providing relatively wet bio-mass material to be dried, as a bed of such bio-mass material over a floor of a dryer, the dryer having an inlet and an outlet, an air supply system being associated with the dryer and releasing air into the bed of bio-mass material,
 (ii) providing a supply of heated air through the air supply system to the bed of bio-mass material, thus to percolate the heated air through the bed of bio-mass material such that a flow of high-humidity air is continually emerging from the bed of bio-mass material,
 (iii) mixing the bed of bio-mass material by applying mixing apparatus to the bed of bio-mass material while the heated air is percolating through the bed of bio-mass material, and;
 (iv) moving the bio-mass material progressively toward the outlet of the dryer, from the inlet of the dryer to the exit of the dryer, whereby a relatively drier, solid-phase, first portion of the bio-mass material is generally displaced from a relatively wetter second portion of the bio-mass material in the bed of bio-mass material;
(b) removing at least a portion of the relatively drier, solid-phase, first portion of bio-mass material as product from the dryer and supplying a first portion of the relatively drier, solid-phase, bio-mass material, removed from the dryer, to a combustor;
(c) recycling a second portion of the relatively drier, solid-phase, bio-mass material, removed from the dryer, back to the inlet of the dryer;
(d) burning, in the combustor, the first portion of the relatively drier, solid-phase, bio-mass material, supplied from the dryer, to produce heat energy; and
(e) converting at least a portion of the heat energy, produced in the combustor, to electrical energy.

50. A method as in claim 49, further comprising venting, to atmosphere, the high-humidity air emerging from the bed of bio-mass material in the dryer.

51. A method as in claim 49, further comprising recycling residual heat from the electrical energy converting process and thereby providing heat to the air supply system.

52. A method as in claim 49, further comprising supplying fresh bio-mass feed material to the dryer to replenish the bio-mass material being removed from the dryer, thereby to operate a relatively continuous drying process.

53. A method as in claim 49, the dryer comprising a receptacle having upstanding walls, the method including containing the bio-mass material in the receptacle while supplying the heated air, moving the mixing apparatus about the bed of bio-mass material thereby periodically mixing first respective portions of the bio-mass material, and periodically moving second respective portions of the bio-mass material progressively toward the outlet of the dryer.

54. A method as in claim 49, further comprising recycling a portion of the relatively drier, solid-phase, bio-mass material product to the inlet of the dryer.

55. A method as in claim 49, further comprising controlling air temperature and flow rate of air flowing through the bed of bio-mass material so as to minimize the production of combustible vapors in the dryer and to maintain the temperature of the bio-mass material below a combustion temperature of the bed of bio-mass material.

56. A method as in claim 49, further comprising sensing a moisture level of the bed of bio-mass material in the dryer, and adjusting one or more of air temperature of heated air being supplied to the bed of bio-mass material in the dryer, mass flow rate of heated air being supplied to the bed of bio-mass material in the dryer, or frequency or rate of mixing of the bio-mass material in the dryer, in response to the sensed moisture level in the bed of bio-mass material in the dryer, thereby to maintain an aerobic environment in the dryer.

57. A method as in claim 49 wherein bio-mass material to be dried is collected, and maintained in a retention system under substantially aerobic conditions prior to being introduced into the dryer.

58. A method as in claim 57, further comprising continually agitating the bio-mass material in the retention system.

59. A method as in claim 49 wherein the bio-mass material enters the dryer at about 65 percent by weight to about 95 percent by weight water and is removed from the dryer at about 30 percent by weight to about 50 percent by weight water.

60. A method as in claim 49, further comprising maintaining the bed of bio-mass material at a temperature, and providing sufficient air flow to the bed of bio-mass material, to maintain a substantially aerobic environment in the bed of bio-mass material.

61. A method as in claim 49 wherein the converting of heat energy produced in the combustor to electrical energy comprises generating steam in a boiler using the heat energy output from the combustor and directing the steam output from the boiler at a first pressure to a steam turbine having an electrical generator coupled to an output shaft of such steam turbine, and further comprising supplying steam, created in the boiler, at a second pressure, lower than the first pressure, to the air supply system and thus heating the air supplied to the dryer.

62. A method as in claim 61 wherein enough steam is provided by the boiler, from combustion of the bio-mass material removed from the dryer, to generate enough electricity to satisfy electrical power demand required to power the dryer and the combustor, and to provide all of the heat required in the dryer.

63. A method of processing relatively wet bio-mass material, comprising:
(a) drying a mass of web bio-mass material by
 (i) providing relatively wet bio-mass material to be dried as a bed of such bio-mass material on a floor of a dryer, the dryer having an inlet and an outlet, an air supply system being associated with the dryer and releasing air into the bed of bio-mass material,
 (ii) providing a supply of heated air through the air supply system to the bed of bio-mass material in the dryer, at low air pressure, at a temperature and at sufficient air flow rate that the heated air percolates through the bed of bio-mass material and emerges, as high humidity air, from the bed of bio-mass material, while maintaining a substantially aerobic environment in the bed of bio-mass material; and
(b) removing a relatively drier, solid-phase, portion of bio-mass material as product from the dryer and supplying at least a portion of the relatively drier, solid-phase, bio-mass material, removed from the dryer, to a combustor;
(c) burning the supplied portion of the relatively dryer bio-mass material in the combustor and thereby producing heat energy;

(d) converting a first portion of the heat energy, produced in the combustor, to electrical energy in a generator; and (e) supplying a second portion of the heat energy to the air supply system in the dryer, wherein the quantity of electricity produced by the generator, along with the second portion of heat energy supplied to the air supply system in the dryer, is sufficient to provide all the heat required in the dryer and all of the electrical energy required to power the dryer and the combustor.

64. A method as in claim 63, further comprising venting, to atmosphere, the high humidity air emerging from the bed of bio-mass material in the dryer.

65. A method as in claim 63, further comprising supplying fresh bio-mass feed material to the dryer to replenish the bio-mass material being removed from the dryer, thereby to operate a relatively continuous drying process.

66. A method as in claim 63, further comprising recycling a portion of the relatively drier, solid-phase, bio-mass material product to the inlet of the dryer.

67. A method as in claim 63, the dryer comprising a receptacle having upstanding walls, the method including containing the bio-mass material in the receptacle while supplying the heated air, moving the mixing apparatus about the bed of bio-mass material thereby periodically mixing first respective portions of the bio-mass material, and periodically moving second respective portions of the bio-mass material progressively toward the outlet of the dryer.

68. A method as in claim 63, further comprising recycling a portion of the relatively drier, solid-phase, bio-mass material product to the inlet of the dryer.

69. A method as in claim 63, further comprising controlling air temperature and flow rate of air flowing through the bed of bio-mass material so as to minimize the production of combustible vapors in the dryer and to maintain the temperature of the bio-mass material below a combustion temperature of the bed of bio-mass material.

70. A method as in claim 63, further comprising sensing a moisture level of the bed of bio-mass material in the dryer, and adjusting one or more of air temperature of heated air being supplied to the bed of bio-mass material in the dryer, mass flow rate of heated air being supplied to the bed of bio-mass material in the dryer, or frequency or rate of mixing of the bio-mass material in the dryer, in response to the sensed moisture level in the bed of bio-mass material in the dryer, thereby to maintain an aerobic environment in the dryer.

71. A method as in claim 63 wherein bio-mass material to be dried is collected, and maintained in a retention system under substantially aerobic conditions prior to being introduced into the dryer.

72. A method as in claim 71, further comprising continually agitating the bio-mass material in the retention system.

73. A method as in claim 63 wherein the bio-mass material enters the dryer at about 65 percent by weight to about 95 percent by weight water and is removed from the dryer at about 30 percent by weight to about 50 percent by weight water.

74. A method as in claim 63, further comprising maintaining the bed of bio-mass material at a temperature, and providing sufficient air flow to the bed of bio-mass material, to maintain a substantially aerobic environment in the bed of bio-mass material.

75. A method as in claim 63 wherein the converting of heat energy produced in the combustor to electrical energy comprises generating steam in a boiler using the heat energy output from the combustor and directing the steam output from the boiler at a first pressure to a steam turbine having an electrical generator coupled to an output shaft of such steam turbine, and further comprising supplying steam, created in the boiler, at a second pressure, lower than the first pressure, to the air supply system and thus heating the air supplied to the dryer.

76. A method as in claim 75 wherein enough steam is provided by the boiler, from combustion of the bio-mass material removed from the dryer, to generate enough electricity to satisfy the electrical power demand required to power the dryer and the combustor, and to provide all of the heat required in the dryer.

77. A method as in claim 63, further comprising recycling residual heat from the energy-converting process and thereby providing heat to the air supply system.

* * * * *